US012725721B2

(12) United States Patent
Hashimoto et al.

(10) Patent No.: US 12,725,721 B2
(45) Date of Patent: Sep. 1, 2026

(54) SAMARIUM-IRON-NITROGEN BASED MAGNET POWDER AND SAMARIUM-IRON-NITROGEN BASED MAGNET

(71) Applicants: TDK CORPORATION, Tokyo (JP); NATIONAL INSTITUTE OF ADVANCED INDUSTRIAL SCIENCE AND TECHNOLOGY, Tokyo (JP)

(72) Inventors: Ryuji Hashimoto, Tokyo (JP); Shusuke Okada, Aichi (JP)

(73) Assignees: TDK Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 42 days.

(21) Appl. No.: 18/848,262

(22) PCT Filed: Dec. 21, 2022

(86) PCT No.: PCT/JP2022/047146
§ 371 (c)(1),
(2) Date: Sep. 18, 2024

(87) PCT Pub. No.: WO2023/181547
PCT Pub. Date: Sep. 28, 2023

(65) Prior Publication Data

US 2025/0210235 A1 Jun. 26, 2025

(30) Foreign Application Priority Data

Mar. 25, 2022 (JP) ................................ 2022-050743

(51) Int. Cl.
*C22C 38/12* (2006.01)
*B22F 1/05* (2022.01)
(Continued)

(52) U.S. Cl.
CPC ................ *H01F 1/059* (2013.01); *B22F 1/05* (2022.01); *B22F 1/142* (2022.01); *B22F 1/145* (2022.01);
(Continued)

(58) Field of Classification Search
CPC ..... C22C 38/001; C22C 38/005; C22C 38/12; C22C 2202/02; B22F 1/17
See application file for complete search history.

(56) References Cited

U.S. PATENT DOCUMENTS

2003/0145910 A1* 8/2003 Mochizuki ............ H01F 1/0571 148/302
2020/0105446 A1 4/2020 Hashimoto et al.

FOREIGN PATENT DOCUMENTS

JP 2020-057779 4/2020

OTHER PUBLICATIONS

International Search Report for PCT/JP2022/047146 mailed on Apr. 4, 2023.

* cited by examiner

*Primary Examiner* — Adam Krupicka
(74) *Attorney, Agent, or Firm* — IPUSA, PLLC

(57) ABSTRACT

A samarium-iron-nitrogen based magnet powder includes a lanthanoid (Ln), iron (Fe), bismuth (Bi), tungsten (W), and nitrogen (N), wherein the lanthanoid includes samarium (Sm), an atomic ratio of bismuth to a sum of the lanthanoid, iron, bismuth, and tungsten (Bi/(Ln+Fe+Bi+W)) is 1.00 at % or less, an atomic ratio of tungsten to the sum of the lanthanoid, iron, bismuth, and tungsten (W/(Ln+Fe+Bi+W)) is 0.05 at % or more and 0.60 at % or less, and an atomic ratio of tungsten to bismuth (W/Bi) is 1.0 or more and 30.0 or less.

9 Claims, 5 Drawing Sheets

(51) Int. Cl.

| | |
|---|---|
| ***B22F 1/142*** | (2022.01) |
| ***B22F 1/145*** | (2022.01) |
| ***B22F 1/17*** | (2022.01) |
| ***B22F 9/02*** | (2006.01) |
| ***B22F 9/22*** | (2006.01) |
| ***B22F 9/30*** | (2006.01) |
| ***C22C 38/00*** | (2006.01) |
| ***H01F 1/059*** | (2006.01) |
| ***H01F 1/06*** | (2006.01) |

(52) U.S. Cl.

CPC ................ *B22F 1/17* (2022.01); *B22F 9/023* (2013.01); *B22F 9/22* (2013.01); *B22F 9/30* (2013.01); *C22C 38/001* (2013.01); *C22C 38/002* (2013.01); *C22C 38/005* (2013.01); *C22C 38/12* (2013.01); *B22F 2201/013* (2013.01); *B22F 2201/016* (2013.01); *B22F 2301/355* (2013.01); *B22F 2304/10* (2013.01); *B22F 2999/00* (2013.01); *C22C 2202/02* (2013.01)

SAMARIUM-IRON-NITROGEN BASED MAGNET POWDER AND SAMARIUM-IRON-NITROGEN BASED MAGNET

TECHNICAL FIELD

The present invention relates to a samarium-iron-nitrogen based magnet powder and a samarium-iron-nitrogen based magnet.

BACKGROUND ART

A samarium-iron-nitrogen based magnet is expected to be a high-performance magnet because of its high Curie temperature of 477° C., its low temperature dependence in magnetic characteristics, and its high anisotropic magnetic field of 260 kOe, which is the theoretical coercivity value.

In order to produce high-performance magnets, it is necessary to sinter a samarium-iron-nitrogen based magnet powder.

However, when the samarium-iron-nitrogen based magnet powder is sintered at a high temperature, magnetic properties are reduced. Especially, the coercivity of the samarium-iron-nitrogen based magnet is greatly reduced by sintering.

In order to address such a problem, Patent Document 1 discloses adding bismuth to the samarium-iron-nitrogen based magnet powder. That is, it is described that it is possible to increase the coercivity of the magnet powder by using a samarium-iron-bismuth-nitrogen based magnet powder.

PRIOR ART LITERATURE

Patent Literature

Patent Document 1: Japanese Unexamined Patent Application Publication No. 2020-57779

SUMMARY OF THE INVENTION

Problems to be Solved by the Invention

In general, coercivity and magnetization are tradeoffs, and it is said that it is difficult to increase both. For example, the inventors of the present application have found that although the samarium-iron-bismuth-nitrogen based magnet powder described in Patent Document 1 exhibits high coercivity, magnetization is not sufficient.

Under such circumstances, there is a need for a samarium-iron-nitrogen based magnet powder having both high magnetization and high coercivity.

The present invention is made in view of such a background, and an object of the present invention is to provide a samarium-iron-nitrogen based magnet powder having high magnetization and high coercivity. Another object of the present invention is to provide a samarium-iron-nitrogen based magnet having both high magnetization and high coercivity.

Means for Solving the Problem

The present invention provides a samarium-iron-nitrogen based magnet powder including a lanthanoid (Ln), iron (Fe), bismuth (Bi), tungsten (W), and nitrogen (N), wherein the lanthanoid includes samarium (Sm), an atomic ratio of bismuth to a sum of the lanthanoid, iron, bismuth, and tungsten (Bi/(Ln+Fe+Bi+W)) is 1.00 at % or less, an atomic ratio of tungsten to the sum of the lanthanoid, iron, bismuth, and tungsten (W/(Ln+Fe+Bi+W)) is 0.05 at % or more and 0.60 at % or less, and an atomic ratio of tungsten to bismuth (W/Bi) is 1.0 or more and 30.0 or less.

Effect of the Invention

According to the present invention, a samarium-iron-nitrogen based magnet powder having high magnetization and high coercivity is provided. According to the present invention, a samarium-iron-nitrogen based magnet having both high magnetization and high coercivity is provided.

DETAILED DESCRIPTION OF THE INVENTION

Figure 1:
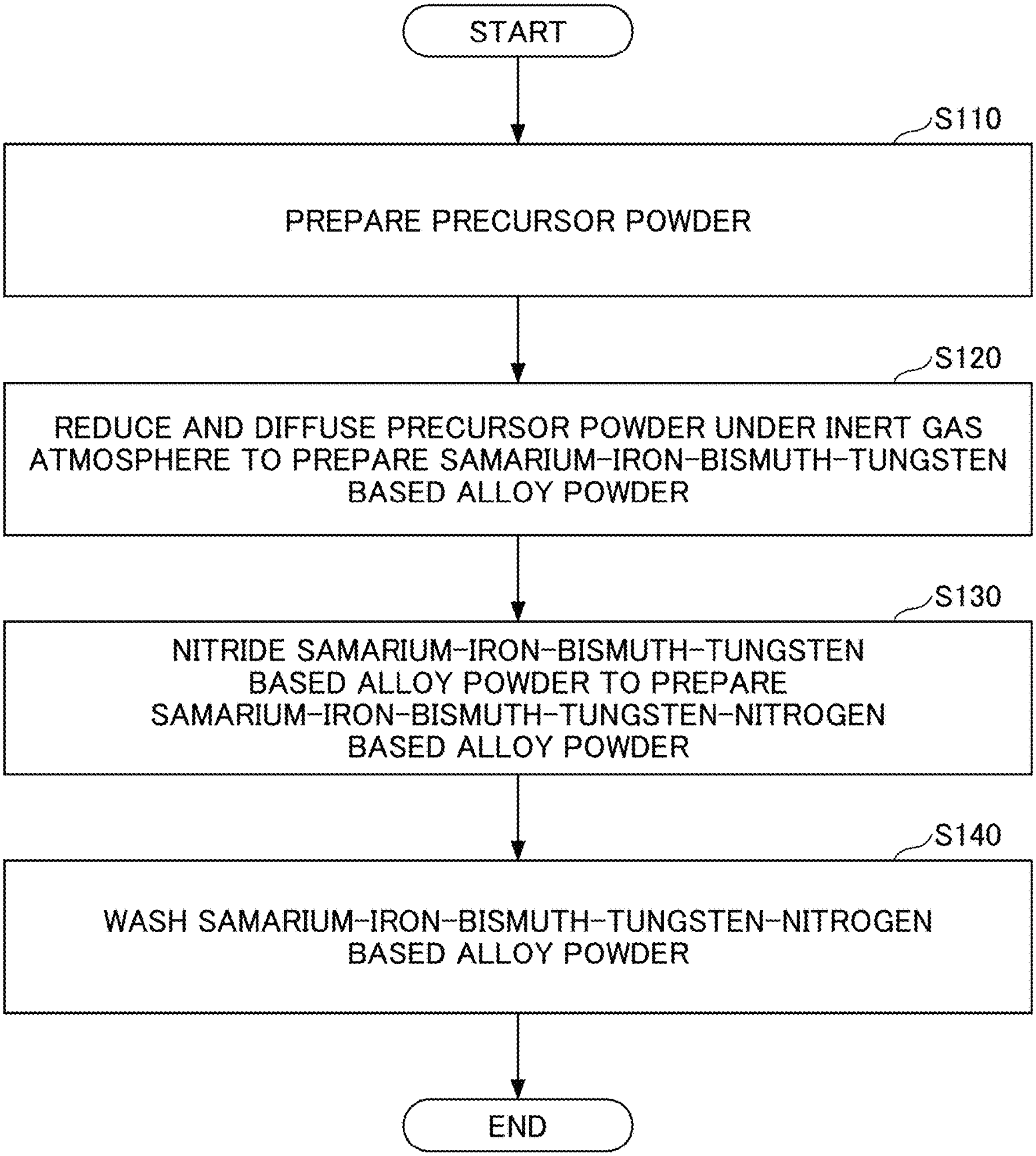
FIG. 1 is a flow diagram schematically illustrating an example of a method of manufacturing a samarium-iron-nitrogen based magnet powder according to an embodiment of the present invention.

Hereinafter, an embodiment of the present invention will be described.

As described above, the inventors of the present application have found that although the samarium-iron-bismuth-nitrogen based magnet powder described in Patent Document 1 exhibits high coercivity, magnetization is not very high.

In order to deal with the problem, the inventors of the present application have intensively researched a samarium-iron-nitrogen based magnet powder having both high magnetization and high coercivity. As a result, the inventors of the present application found that magnetization and coercivity of magnet powders can be significantly increased by adding a predetermined amount of bismuth and tungsten to a samarium-iron-nitrogen based magnet powder and using it as a samarium-iron-bismuth-tungsten-nitrogen based magnet powder, leading to the present invention.

One embodiment of the present invention provides a samarium-iron-nitrogen based magnet powder including a lanthanoid (Ln), iron (Fe), bismuth (Bi), tungsten (W), and nitrogen (N), wherein the lanthanoid includes samarium (Sm), an atomic ratio of bismuth to a sum of the lanthanoid, iron, bismuth, and tungsten (Bi/(Ln+Fe+Bi+W)) is 1.00 at % or less, an atomic ratio of tungsten to the sum of the lanthanoid, iron, bismuth, and tungsten (W/(Ln+Fe+Bi+W)) is 0.05 at % or more and 0.60 at % or less, and an atomic ratio of tungsten to bismuth (W/Bi) is 1.0 or more and 30.0 or less.

In the present application, a samarium-iron-bismuth-tungsten-nitrogen based magnet powder according to an embodiment of the present invention is also referred to as a "samarium-iron-nitrogen based magnet powder".

In a samarium-iron-nitrogen based magnet powder according to an embodiment of the present invention, bismuth is added so that the ratio of bismuth to the sum of the lanthanoid (In)+iron+bismuth+tungsten (Bi/(Ln+Fe+Bi+W)) is 1.00 at % or less. In the samarium-iron-nitrogen based magnet powder according to an embodiment of the present invention, tungsten is added so that the ratio of tungsten to the sum of the lanthanoid+iron+bismuth+tungsten (W/(Ln+Fe+Bi+W)) is 0.05 at % or more and 0.60 at % or less. The ratio of tungsten to bismuth (W/Bi) is 1.0 or more and 30.0 or less.

In an embodiment of the present invention, by adding bismuth and tungsten at such a ratio, a magnet powder with high magnetization and high coercivity is obtained.

The reason why the magnet powder with high magnetization and high coercivity is obtained by adding bismuth and tungsten is not fully understood. However, as will be described later, the lattice constant Pa in the a-axis direction and the lattice constant Pc in the c-axis direction are both larger in the samarium-iron-nitrogen based magnet powder according to an embodiment of the present invention compared to the basic samarium-iron-nitrogen based magnet powder. Therefore, it is possible that, by adding bismuth and tungsten together, at least a part of the samarium and/or Fe is replaced with Bi and/or W and the stability of the crystal structure of the particles constituting the magnet powder is improved, thereby increasing the coercivity without decreasing the magnetization. In the samarium-iron-nitrogen based magnet powder according to an embodiment of the present invention, it is preferable that Bi/(Ln+Fe+Bi+W) is 0.1 at % or less and more preferably 0.05 at % or less.

In the samarium-iron-nitrogen based magnet powder according to an embodiment of the present invention, it is preferable that W/(Ln+Fe+Bi+W) is 0.41 at % or less.

Further, in the samarium-iron-nitrogen based magnet powder according to an embodiment of the present invention, it is preferable that the atomic ratio w/Bi is 20.5 or less.

When W/(Ln+Fe+Bi+W) is less than 0.05 at %, or more than 0.60 at %, no improvement in magnetization is observed. Similarly, when the atomic ratio W/Bi is less than 1.0, or more than 30.0, no improvement in magnetization is observed.

(Samarium-Iron-Nitrogen Based Magnet Powder According to Embodiment of Present Invention)

Hereinafter, other features of the samarium-iron-nitrogen based magnet powder according to an embodiment of the present invention will be described.

(Composition)

The samarium-iron-nitrogen based magnet powder according to an embodiment of the present invention (hereinafter simply referred to as "magnet powder of the present invention") contains a lanthanoid. The lanthanoid may include samarium only, or may further include at least one additional element selected from a group consisting of lanthanum (La), cerium (Ce), erbium (Er), thulium (Tm), and ytterbium (Yb).

In the magnet powder of the present invention, the range of the ratio of the lanthanoid to the sum of the lanthanoid+iron+bismuth+tungsten (Ln/(Ln+Fe+Bi+W)) is 10.0 at % to 15.0 at %, for example.

In the magnet powder of the present invention, the range of the ratio of iron to the sum of the lanthanoid+iron+bismuth+tungsten (Fe/(Ln+Fe+Bi+W)) is 85.0 at % to 90.0 at %, for example.

(Form)

The magnet powder of the present invention includes a number of particles. Each of the particles has a core portion. At least a part of the core portion may be provided with a coating layer. The coating layer may coat the entire core portion. Particles that do not have a coating layer and particles that are composed only of a core portion may also be included.

The core portion of the particles typically includes the lanthanoid, iron, bismuth, tungsten, and nitrogen.

The core portion of the particles typically has a $Th_2Zn_{17}$-type crystal structure.

The core portion of the particles may include, for example, a lanthanoid-iron-nitrogen based compound phase. The core portion of the particles may include, for example, an $Ln_2Fe_{17}N_3$ phase. At least a part of Ln of the $Ln_2Fe_{17}N_3$ phase may be substituted with Bi and/or W. Similarly, at least a part of Fe of the $Ln_2Fe_{17}N_3$ phase may be substituted with Bi and/or W.

The coating layer includes the lanthanoid and/or iron, and has a crystal structure different from the core portion.

The coating layer may include more of the lanthanoid than the core portion. That is, the atomic ratio of the lanthanoid to iron (Ln/Fe) in the coating layer may be greater than the atomic ratio of the lanthanoid to iron (Ln/Fe) in the core portion.

The average particle size of the particles is not particularly limited, but may be, for example, less than 1.5 μm. Accordingly, the coercivity of the magnet powder of the present invention can be further increased.

In the magnet powder of the present invention, the number of particles having an aspect ratio of 2.0 or more is 10% or less, and preferably 8% or less. When the number of particles having an aspect ratio of 2.0 or more is 10% or less, the coercivity of the magnet powder of the present invention can be further increased.

The magnet powder of the present invention has a high decomposition temperature. For example, the nitrogen release temperature of the magnet powder of the present invention is 610° C. or more.

The coercivity of the magnet powder of the present invention before heat treatment is, for example, 17 kOe or more. The magnetization of the magnet powder of the present invention is, for example, 140 emu/g or more. Accordingly, the magnet powder of the present invention a magnet powder having both high can be used magnetization and high coercivity. In the present application, magnetization means the value of magnetization when a magnetic field of 90 kOe is applied.

The magnet powder of the present invention having the above-described characteristics may be used in manufacture of a high-performance samarium-iron-nitrogen based magnet.

(Samarium-Iron-Nitrogen Based Magnet)

The samarium-iron-nitrogen based magnet according to an embodiment of the present invention (hereinafter simply referred to as a "magnet of the present invention" contains the magnet powder of the present invention.

The magnet of the present invention may be a samarium-iron-nitrogen based sintered magnet or a samarium-iron-nitrogen based bonded magnet.

In the magnet of the present invention, the rare earth magnet of the present embodiment may have a metal phase other than the Sm—Fe—N based magnet powder. Such a metal phase may be, for example, a Fe phase or the like.

The rare earth magnet of the present embodiment may further contain, in addition to Sm, Fe, and N, at least one element selected from elements, such as, for example, C, Al, Si, P, Ti, Cr, Mn, Co, Cu, Zn, Y, Zr, and Sn. The content of the elements other than Sm, Fe, and N is preferably 10% by mass or less, and more preferably 5% by mass or less.

(Method for Manufacturing Samarium-Iron-Nitrogen Based Magnet Powder According to Embodiment of Present Invention)

Next, an example of a method of manufacturing the samarium-iron-nitrogen based magnet powder according to an embodiment of the present invention (hereinafter referred to as a "first method") will be described with reference to FIG. 1.

In the following description, the first method will be described with reference to a case in which only samarium is included as the lanthanoid (Ln). It will be apparent to those skilled in the art that similar methods can be applied when the lanthanoid (Ln) includes another lanthanoid element (at least one of La, Ce, Er, Tm, and Yb) in addition to samarium.

FIG. 1 schematically illustrates an example of a flow of the first method.

As illustrated in FIG. 1, the first method includes: preparing a precursor powder (S110); reducing and diffusing the precursor powder under an inert gas atmosphere to prepare a samarium-iron-bismuth-tungsten based alloy powder (S120); nitriding the samarium-iron-bismuth-tungsten based alloy powder to prepare a samarium-iron-bismuth-tungsten-nitrogen based alloy powder (S130); and washing the samarium-iron-bismuth-tungsten-nitrogen based alloy powder (S140).

Each process will be described below.

(Step S110)

First, a precursor powder is produced.

The precursor powder may be, for example, a samarium-iron-bismuth-tungsten based oxide powder or a samarium-iron-bismuth-tungsten based hydroxide powder. Hereinafter, the samarium-iron-bismuth-tungsten based oxide powder and the samarium-iron-bismuth-tungsten based hydroxide powder are collectively referred to as a samarium-iron-bismuth-tungsten based (hydr)oxide powder.

The samarium-iron-bismuth-tungsten based (hydr)oxide powder may be prepared by spray pyrolysis.

In this method, first, a solution containing a samarium salt, an iron salt, a bismuth salt, and a tungsten salt is prepared. The composition of the samarium-iron-nitrogen based magnet powder can be controlled to a desired value by adjusting the added amounts of the samarium salt, the iron salt, the bismuth salt, and the tungsten salt.

As a solvent contained in the solution, water may be used, or an organic solvent, such as ethanol, may be used.

The counter ion in the samarium salt, the iron salt, the bismuth salt, and the tungsten salt may also be an inorganic ion, such as a chloride ion, sulfate ion, or nitrate ion. Alternatively, the counter ion may be an organic ion, such as an alkoxide.

When adding the bismuth salt and the tungsten salt to the solution, it is preferable to adjust the pH to an acidic side in order to properly dissolve them. Nitric acid or the like is preferably used for such pH adjustment. When the pH of the solution is neutral or alkaline, the bismuth salt and the tungsten salt tend to remain undissolved. Thus, the ratio of tungsten to bismuth in the obtained samarium-iron-nitrogen based magnet powder tends to deviate from the desired range. By properly dissolving the bismuth salt and the tungsten salt in the solution, the bismuth and tungsten contents of the obtained samarium-iron-nitrogen based magnet powder can be controlled within the desired range.

Next, the prepared solution is supplied into a heated reaction tube, and the solution is pyrolyzed. When supplying the solution, an ultrasonic atomizer, two-fluid atomizer, and the like may be used. In this process, the solution is formed into fine droplets and introduced into the reaction tube along with a carrier gas. The supplied solution or droplets is pyrolyzed in the reaction tube. The temperature in the reaction tube is, for example, in the range of 400° C. to 1000° C.

Particles produced by the pyrolysis of the solution or the droplets are then collected by a filter at the outlet of the reaction tube. As a result, a samarium-iron-bismuth-tungsten based (hydr)oxide powder is obtained.

The obtained precursor powder may then be handled in a non-oxidizing atmosphere, such as a glovebox, until a samarium-iron-nitrogen based magnet powder is produced. When an inert gas atmosphere is used as the non-oxidizing atmosphere, it is preferable that the oxygen concentration is 1 ppm or less.

The obtained precursor powder is preferably pre-reduced in a reducing atmosphere. Accordingly, the amount of calcium used in the subsequent reducing and diffusing step (step S120) can be reduced, and the generation of coarse samarium-iron-bismuth-tungsten based alloy particles can be prevented.

Pre-reduction of the precursor powder may be performed, for example, by heating the precursor powder to 400° C. or higher in a hydrogen atmosphere. The processing temperature is preferably in the range of 500° C. to 800° C. When the pre-reduction is performed within the temperature range, samarium-iron-bismuth-tungsten based alloy particles having a uniform particle size can be obtained in the subsequent steps.

(Step S120)

The precursor powder is then reduced and diffused under an inert gas atmosphere to form a samarium-iron-bismuth-tungsten based alloy powder (hereinafter, simply referred to as an "alloy powder I").

A method of reducing and diffusing the precursor powder includes, for example, a method in which the precursor powder is mixed with calcium (Ca) or calcium hydride ($CaH_2$) and then heated to a temperature above the melting point of Ca (about 850° C.), and the like.

During this process, the calcium-reduced samarium diffuses in the calcium melt and reacts with iron, bismuth, and tungsten to form alloy powder I.

There is a correlation between the temperature of the reducing and diffusing process and the particle size of the particles included in the alloy powder I. The higher the temperature of the reducing and diffusing, the larger the particle size of the particles included in the alloy powder I.

The average particle size of the particles included in the alloy powder I is preferably 3.0 μm or less. When the average particle size is 3.0 μm or less, the coercivity of the finally obtained magnet powder is further increased.

In order to obtain the alloy powder I that includes particles having a uniform particle size, the precursor powder is preferably reduced and diffused at 850° C. to 1050° C. for about 1 minute to 2 hours under an inert gas atmosphere.

Each of the particles of the alloy powder I is crystallized as the reducing and diffusing progresses, and a core portion having, for example, a $Th_2Zn_{17}$-type structure is formed. In this process, a coating layer is formed on at least a part of the surface of the core portion.

(Step S130)

Next, the obtained alloy powder I is nitrided to form a samarium-iron-bismuth-tungsten-nitrogen based alloy powder (hereinafter, simply referred to as an "alloy powder II").

A method of nitriding the alloy powder I includes a method of heat-treating the alloy powder I at 300° C. to 500° C. under an atmosphere, such as ammonia, a mixed gas of ammonia and hydrogen, nitrogen, or a mixed gas of nitrogen and hydrogen, and the like.

When ammonia is used, the alloy powder I can be nitrided in a short time. However, the nitrogen content in the alloy powder II may be higher than the optimal value. In this case, it is preferable to anneal the alloy powder II in hydrogen after the nitriding process. Accordingly, excess nitrogen can be expelled from the crystal lattice. Preferably, the composition of the particles included in the alloy powder II is $Sm_2Fe_{17}N_3$.

For example, the alloy powder I is heat treated at 350° C. to 450° C. for 10 minutes to 2 hours under an ammonia-hydrogen mixed atmosphere, and then annealed at 350° C. to 450° C. for 30 minutes to 2 hours under a hydrogen atmosphere. Thus, the nitrogen content in the alloy powder II can be optimized.

(Step S140)

The alloy powder II formed in step S130 is then washed.

The alloy powder II formed in step S130 includes a calcium compound. The washing process is performed to remove such a calcium compound.

The washing process is performed using a washing liquid, such as, for example, water and/or alcohol. For example, by repeating the operation of adding water to the alloy powder II and then stirring and decanting, most of the calcium compound contained in the alloy powder II can be removed.

The washing process may be performed prior to the nitriding process.

A samarium-iron-bismuth-tungsten-nitrogen based magnet powder can be manufactured by the above steps.

The following additional step (step S150) may be performed on the samarium-iron-bismuth-tungsten-nitrogen based magnet powder obtained in step S140 (hereinafter, simply referred to as "manufactured powder").

(Step S150)

Preferably, the manufactured powder obtained in step S140 is vacuum dried.

The drying temperature is preferably, but not limited to, in the range of room temperature to 100° C. By setting the drying temperature to 100° C. or less, oxidation of the manufactured powder can be prevented.

Dehydrogenation may be performed the manufactured powder. By performing dehydrogenation, hydrogen that has entered between the crystal lattices during the washing process can be removed.

The method of dehydrogenation is not particularly limited. For example, dehydrogenation may be performed by heating the manufactured powder under vacuum or under an inert gas atmosphere. For example, dehydrogenation may performed by heating the manufactured powder at 150° C. to 450° C. for 1 hour under an argon atmosphere.

The manufactured powder may be subsequently ground. Accordingly, the residual magnetization and maximum energy product of the manufactured powder is improved.

In the present application, the term "grind" is used as a separate term from "pulverize".

That is, "grind" means separating one or more particles from an aggregate in which a plurality of particles are aggregated. In contrast, "pulverize" means dividing a single particle into smaller pieces.

When grinding the manufactured powder, a jet mill, a dry and wet ball mill, a vibration mill, a medium agitation mill, and the like may be used.

The grinding does not necessarily need to be performed at this stage. For example, the grinding may be performed on the alloy powder I obtained in step S120.

(Method of Manufacturing Samarium-Iron-Bismuth-Tungsten-Nitrogen Based Sintered Magnet)

Next, an example of a method of manufacturing a samarium-iron-bismuth-tungsten-nitrogen based sintered magnet using the magnet powder of the present invention (hereinafter referred to as a "second method") will be described with reference to FIG. 2.

In the following description, the second method will be described with reference to a case in which only samarium is included as the lanthanoid (Ln). It will be apparent to those skilled in the art that similar methods can be applied when the lanthanoid (Ln) includes another lanthanoid element (at least one of La, Ce, Er, Tm, and Yb) in addition to samarium.

Figure 2:
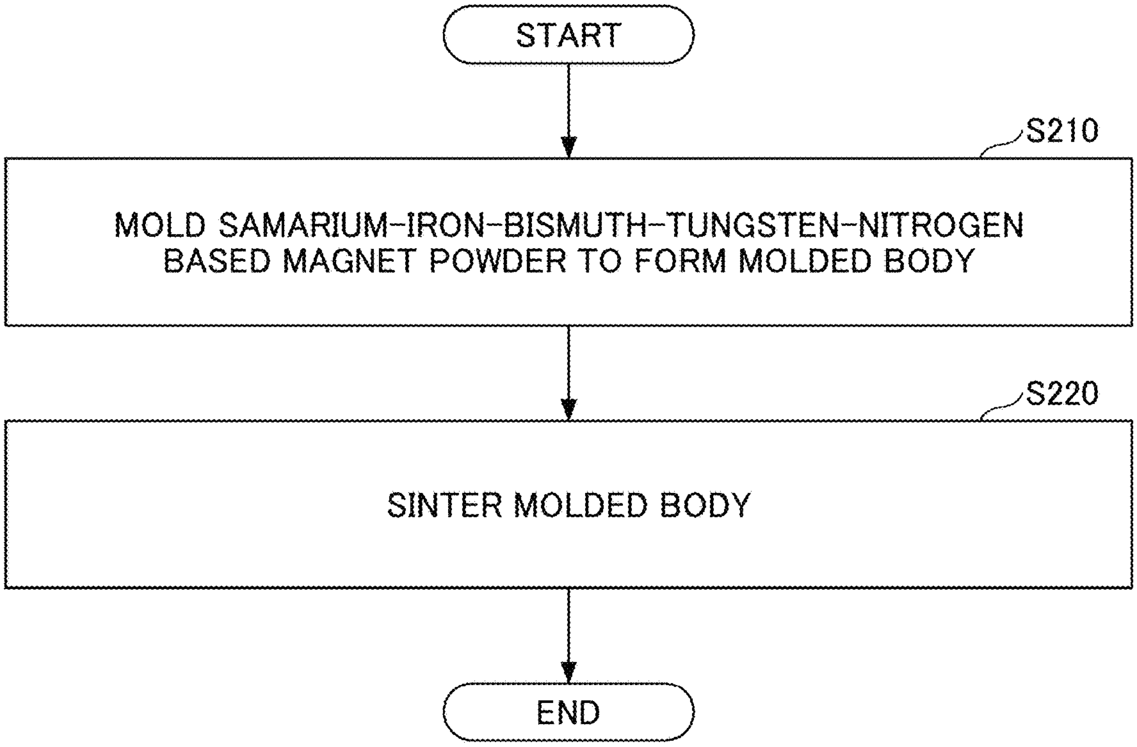
FIG. 2 is a flow diagram schematically illustrating an example of a method of manufacturing a samarium-iron-bismuth-tungsten-nitrogen based sintered magnet using a samarium-iron-nitrogen based magnet powder according to an embodiment of the present invention.

FIG. 2 schematically illustrates an example of a flow of the second method.

As illustrated in FIG. 2, the second method includes: molding a samarium-iron-bismuth-tungsten-nitrogen based magnet powder to form a molded body (step S210); and sintering the molded body (step S220).

Each process will be described below.

(Step S210)

First, a samarium-iron-bismuth-tungsten-nitrogen based magnet powder having the characteristics described above is prepared. The magnet powder is molded to form a molded body.

The method of molding is not particularly limited, and a typical method of molding a magnet powder may be used. The applied pressure during molding may be, for example, in the range of 10 MPa to 3000 MPa.

When molding, the magnet powder may be molded while a magnetic field is applied to the magnet powder. Accordingly, because the magnet powder included in the molded body is oriented in a specific direction, an anisotropic magnet having high magnetic properties can be obtained.

(Step S220)

Next, the molded body is sintered.

The method of sintering is not particularly limited, and a typical sintering method, such as a discharge plasma method, a hot press method, or the like, may be used.

The sintering temperature may be, for example, in the range of 300° C. to 650° C.

Step S210 and step S220 may be performed using the same device.

A samarium-iron-bismuth-tungsten-nitrogen based sintered magnet can be manufactured by the above steps.

(Method of Manufacturing Samarium-Iron-Bismuth-Tungsten-Nitrogen Based Non-Sintered Magnet)

Next, an example of a method of manufacturing a samarium-iron-bismuth-tungsten-nitrogen based non-sintered magnet (hereinafter, referred to as a "third method") will be described with reference to FIG. 3.

In the following description, the third method will be described with reference to a case in which only samarium is included as the lanthanoid (Ln). It will be apparent to those skilled in the art that similar methods can be applied when the lanthanoid (Ln) includes another lanthanoid element (at least one of La, Ce, Er, Tm, and Yb) in addition to samarium.

Figure 3:
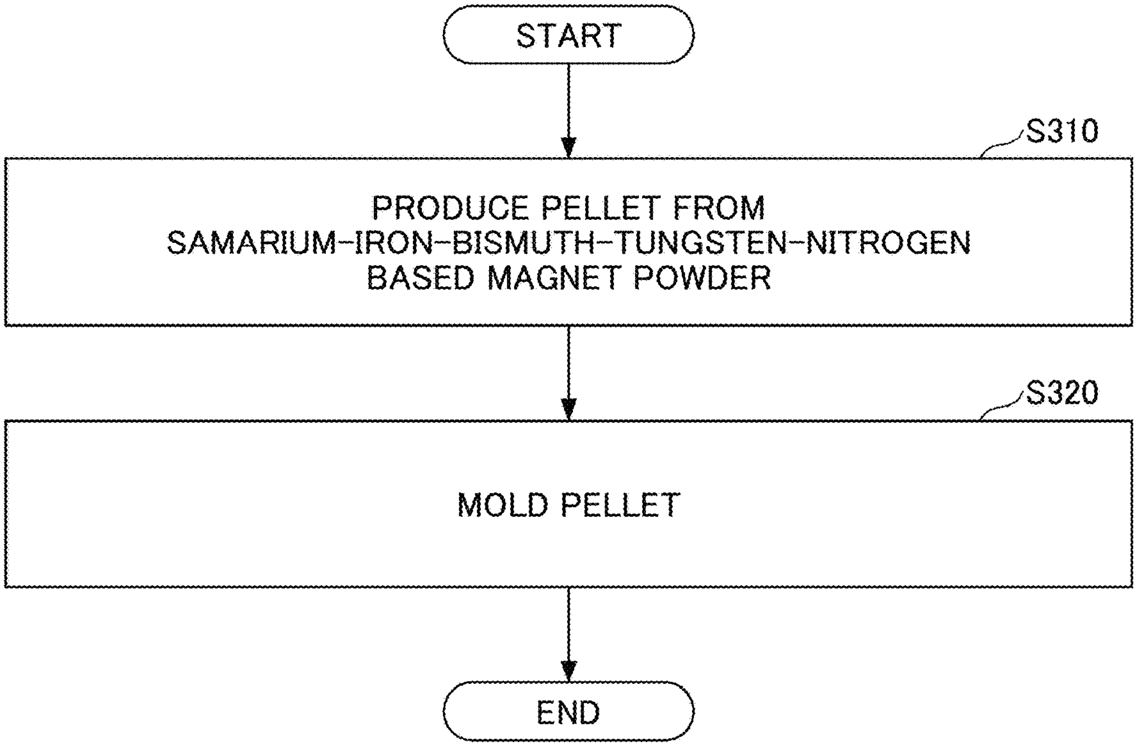
FIG. 3 is a flow diagram schematically illustrating an example of a method of manufacturing a samarium-iron-bismuth-tungsten-nitrogen based non-sintered magnet using a samarium-iron-nitrogen based magnet powder according to an embodiment of the present invention.

FIG. 3 schematically illustrates an example of a flow of the third method.

As illustrated in FIG. 3, the third method includes: producing a pellet from a samarium-iron-bismuth-tungsten-nitrogen based magnet powder (step S310); and molding the pellet (step S320).

Each process will be described below.

(Step S310)

First, a pellet is produced from a samarium-iron-bismuth-tungsten-nitrogen based magnet powder.

The magnet powder and a resin are mixed. The resin may be a thermosetting resin or a thermoplastic resin. In particular, a thermoplastic resin is preferred. Examples of a suitable thermoplastic resin include polyamide (PA), polyphenylene sulfide (PPS), and the like.

Next, the mixture is heated and kneaded, and the kneaded product is pelletized using a pelletizer or the like. The heating temperature may be, for example, in the range of 150° C. to 330° C.

(Step S320)

Next, the pellet produced in step S310 is molded.

For the molding process, injection molding may be used. Accordingly, from the pellet introduced into the injection molding apparatus, a molded body that is injection-molded and has a predetermined shape can be obtained.

Thus, a bonded magnet that is molded can be obtained.

An anisotropic bonded magnet may be obtained by molding the pellet while a magnetic field is applied to the mold.

A samarium-iron-bismuth-tungsten-nitrogen based non-sintered magnet can be manufactured by the above steps.

EXAMPLES

Hereinafter, examples of the present invention will be described. In the following description, Examples 1 to 9 are examples, and Examples 11 to 16 are comparative examples.

Example 1

A magnet powder was produced by the following method.

(Production of Precursor Powder)

63.10 g of iron nitrate nonahydrate, 12.63 g of samarium nitrate hexahydrate, 0.62 g of lanthanum nitrate hexahydrate, 0.77 g of bismuth nitrate pentahydrate, and 0.20 g of ammonium tungstate para pentahydrate were added to 1800 ml of water, and then 10.50 ml of nitric acid was added with stirring to dissolve each of the salts.

Using a spray pyrolyzer, the prepared solution was dropletized and the droplets were pyrolyzed. The spray pyrolyzer was provided with an ultrasonic atomizer and a heated reactor tube at the inlet, and a filter at the outlet of the reactor tube.

The solution introduced into the spray pyrolyzer was converted into a fine droplet by the ultrasonic atomizer. The droplets were supplied into the reaction tube along with a carrier gas (atmosphere). The reaction tube was pre-heated and the droplets were pyrolyzed in the reaction tube. Thereafter, the pyrolyzed product was collected by the filter. The temperature in the reaction tube was 900° C.

The pyrolyzed product was collected on the filter at the outlet of the reaction tube.

Next, the obtained pyrolyzed product was then pre-reduced under a hydrogen atmosphere. The processing temperature was 600° C. and the processing time was 6 hours. Thus, a precursor powder containing samarium and lanthanum, as a lanthanoid, were obtained.

(Reducing and Diffusing Process)

Next, the precursor powder was reduced and diffused by placing 5 g of the precursor powder and 2.5 g of calcium metal in an iron crucible and heating at 975° C. for 1 hour.

Thus, an alloy powder (hereinafter, referred to as an "alloy powder A") was prepared.

(Nitride Process)

Next, after the alloy powder A was cooled to room temperature, the temperature of the alloy powder A was raised to 420° C. under an ammonia and hydrogen mixed atmosphere with a volume ratio of 1:2, and the temperature was maintained for 1 hour to perform a nitriding process.

Thus, an alloy powder B was prepared.

Next, in order to optimize the nitrogen content contained in the alloy powder B, a heat treatment was further performed on the alloy powder B. The heat treatment was performed by annealing the alloy powder B at 420° C. for 1 hour under a hydrogen atmosphere, and then annealing the alloy powder B at 420° C. for 0.5 hours under an argon atmosphere.

(Washing Process)

Next, the alloy powder B whose nitrogen content was optimized was washed with pure water five times to remove a calcium compound and the like. Thus, an alloy powder C was obtained.

(Vacuum Drying Process)

Next, in order to remove the residual water in the alloy powder C, the alloy powder C was immersed in a 2-propanol solution, and then the alloy powder C was dried under vacuum at room temperature.

After the vacuum drying process, the alloy powder C was dehydrogenated at 200° C. for 3 hours under vacuum.

Thus, a magnet powder was produced.

In the above-described method, each step after the pre-reduction process was performed in a glove box under an argon atmosphere.

Examples 2 to 6

Magnet powders were produced by the same method as Example 1 except that in Examples 2 to 6, the composition of the precursor powder was changed from that of Example 1 to produce a magnet powder. Other manufacturing conditions were the same as Example 1.

Example 7

A magnet powder was produced by the same method as Example 1 except that in Example 7, the lanthanum compound was not added when preparing the precursor powder. Thus, a precursor powder containing only samarium as the lanthanoid (Ln) was prepared. The reducing and diffusing process temperature was 1025° C. Other manufacturing conditions were the same as Example 1.

Examples 8 to 9

Magnet powders were produced by the same method as Example 1 except that in Examples 8 to 9, the composition of the precursor powder was changed from that of Example 1 to produce a magnet powder. Other manufacturing conditions were the same as Example 1.

Examples 11 to 13

Magnet powders were produced by the same method as Example 1 except that in Examples 11 to 13, the lanthanum compound, the bismuth compound, and the tungsten compound were not added when preparing the precursor powder. In Examples 11 to 13, samarium-iron based precursor powders were prepared. Other manufacturing conditions are the same as Example 1.

Example 14

A magnet powder was produced by the same method as Example 1 except that in Example 14, the lanthanum compound and the tungsten compound were not added when preparing the precursor powder. In Example 14, a samarium-iron-bismuth based precursor powder was prepared. The reducing and diffusing process temperature was 920° C. Other manufacturing conditions were the same as Example 1.

Examples 15 to 16

Magnet powders were produced by the same method as Example 1 except that in Examples 15 to 16, the amount of each component contained in the precursor powder was changed from that of Example 1 to produce a magnet powder. The reducing and diffusing process temperature was 930° C. in Example 15, and 975° C. in Example 16. Other manufacturing conditions were the same as Example 1.

(Evaluation)

The following evaluations were performed using the magnet powder obtained in each example.

(X-Ray Diffraction Measurement)

The X-ray diffraction (XRD) spectra of the magnet powder in each example were determined. As a result, it was found that, in all of the magnet powders, the main phase had a $Th_2Zn_{17}$-type structure.

The nitrogen content of each magnet powder was measured by the inert gas melting-thermal conductivity method. As a result, the nitrogen content of each magnet powder was about 3.3% by mass.

(Composition Analysis)

The composition of each magnet powder was analyzed by inductively coupled plasma emission spectroscopy. As a result, it has been confirmed that the magnet powders of Examples 1 to 6 were samarium-lanthanum-iron-bismuth-tungsten-nitrogen based magnet powders, the magnet powder of Example 7 was a samarium-iron-bismuth-tungsten-nitrogen based magnet powder, and the magnet powders of Examples 8 to 9 were samarium-lanthanum-iron-bismuth-tungsten-nitrogen based magnet powders.

Further, it has been confirmed that the magnet powders of Examples 11 to 13 were samarium-iron-nitrogen based magnet powders, the magnet powder of Example 14 was a samarium-iron-bismuth-nitrogen based magnet powder, and the magnet powders of Examples 15 to 16 were samarium-lanthanum-iron-bismuth-tungsten-nitrogen based magnet powders.

Table 1 below summarizes the composition of each magnet powder and the like.

TABLE 1

| EXAMPLE | TYPE OF MAGNET POWDER | Sm/ (Ln + Fe + Bi + W) (at %) | La/ (Ln + Fe + Bi + W) (at %) | Fe/ (Ln + Fe + Bi + W) (at %) | Bi/ (Ln + Fe + Bi + W) (at %) | W/ (Ln + Fe + Bi + W) (at %) | W/Bi (ATOMIC RATIO) |
|---|---|---|---|---|---|---|---|
| 1 | Sm—La—Fe—Bi—W—N BASED | 10.58 | 0.15 | 89.12 | 0.03 | 0.12 | 4.0 |
| 2 | Sm—La—Fe—Bi—W—N BASED | 10.51 | 0.13 | 89.22 | 0.02 | 0.11 | 5.5 |
| 3 | Sm—La—Fe—Bi—W—N BASED | 10.71 | 0.13 | 89.02 | 0.01 | 0.13 | 13.0 |
| 4 | Sm—La—Fe—Bi—W—N BASED | 10.46 | 0.15 | 89.29 | 0.04 | 0.06 | 1.3 |
| 5 | Sm—La—Fe—Bi—W—N BASED | 10.81 | 0.14 | 88.43 | 0.02 | 0.60 | 30.0 |
| 6 | Sm—La—Fe—Bi—W—N BASED | 10.72 | 0.14 | 88.71 | 0.02 | 0.41 | 20.5 |
| 7 | Sm—Fe—Bi—W—N BASED | 10.75 | — | 89.10 | 0.03 | 0.12 | 4.0 |
| 8 | Sm—La—Fe—Bi—W—N BASED | 10.43 | 0.30 | 89.12 | 0.03 | 0.12 | 4.0 |
| 9 | Sm—La—Fe—Bi—W—N BASED | 10.50 | 0.23 | 89.12 | 0.03 | 0.12 | 4.0 |
| 11 | Sm—Fe—N BASED | 10.78 | — | 89.22 | — | — | — |
| 12 | Sm—Fe—N BASED | 10.78 | — | 89.22 | — | — | — |
| 13 | Sm—Fe—N BASED | 10.78 | — | 89.22 | — | — | — |
| 14 | Sm—Fe—Bi—N BASED | 10.77 | — | 89.22 | 0.01 | — | — |
| 15 | Sm—La—Fe—Bi—W—N BASED | 10.63 | 0.14 | 89.18 | 0.03 | 0.02 | 0.7 |
| 16 | Sm—La—Fe—Bi—W—N BASED | 10.81 | 0.14 | 88.35 | 0.02 | 0.68 | 34.0 |

In Table 1, "W/Bi" means the ratio (atomic ratio) of the amount of tungsten to the amount of bismuth contained in the magnet powder.

(Measurement of Average Particle Size and Aspect Ratio)

The average particle size of each magnet powder was measured using a scanning electron microscope (FE-SEM).

For the measurements, 200 or more particles were randomly selected, and for each selected particle a contour was determined. The diameter of the circle having the same area as the region surrounded by the contour was defined as the particle size of the particle. The average particle size of the particles included in each magnet powder was determined as the arithmetic average particle size obtained for each selected particle.

Similarly, each of the selected particles was used to calculate an aspect ratio. From the results, the percentage of particles having an aspect ratio of 2.0 or more was calculated. The aspect ratio was defined as a value obtained by dividing the length of the long side by the length of the short side of a rectangle that circumscribes the outline of the particle and has the smallest area.

(Observation of Coating Layer)

By the following method, in the magnet powders of Examples 1 to 9, whether a coating layer was formed on the surface of the core portion of the particles was evaluated.

First, a part of each magnet powder was collected, kneaded with a thermosetting epoxy resin, and thermally cured to produce a sample. The sample was irradiated with a focused ion beam (FIB) and etched to expose the cross-section of the sample.

A scanning transmission electron microscope (STEM) and energy dispersive X-ray spectroscopy (EDS) were used to observe the cross-section of the sample to determine the presence or absence of the coating layer.

As a result of the observation, it was found that the magnet powders of Examples 1 to 9 had the coating layer on the surface of the core portion of the particles.

The compositions of the core portion and the coating layer were analyzed by energy dispersive X-ray spectroscopy (EDS). As a result, the atomic ratio of the lanthanoid to iron (Ln/Fe) in the coating layer was greater than the atomic ratio of the lanthanoid to iron (Ln/Fe) in the core portion.

(Measurement of Coercivity and Magnetization)

The coercivity and magnetization were measured using the magnet powder of each of the example.

First, the magnet powder and a thermoplastic resin were mixed and then oriented in a magnetic field of 20 kOe to produce a sample for measurement.

Next, a vibrating sample magnetometer (VSM) was used to measure the coercivity and magnetization of the samples. The measured temperature was 27° C. and the maximum applied magnetic field was 90 kOe. The applied magnetic field was applied along the axis of easy magnetization of the sample.

Here, magnetization means the value of magnetization obtained when a magnetic field of 90 kOe is applied.

Table 2 below summarizes the evaluation results obtained for each magnet powder.

TABLE 2

| | COERCIVITY (kOe) | MAGNETIZATION (emu/g) | AVERAGE PARTICLE SIZE (nm) | PERCENTAGE OF PARTICLES HAVING ASPECT RATIO OF 2.0 OR MORE (%) |
|---|---|---|---|---|
| 1 | 21.1 | 147 | 889 | 6 |
| 2 | 19.1 | 149 | 975 | 6 |
| 3 | 22.5 | 145 | 812 | — |
| 4 | 17.0 | 151 | 928 | — |
| 5 | 26.0 | 142 | 750 | — |
| 6 | 25.5 | 143 | 819 | — |
| 7 | 21.0 | 147 | 924 | — |
| 8 | 23.9 | 147 | 836 | — |
| 9 | 22.2 | 147 | 850 | — |
| 11 | 18.1 | 145 | 1145 | — |
| 12 | 19.2 | 144 | 1061 | — |
| 13 | 20.2 | 143 | 983 | — |
| 14 | 23.6 | 139 | 750 | — |
| 15 | 26.8 | 135 | 652 | — |
| 16 | 21.6 | 133 | 566 | — |

Figure 4:
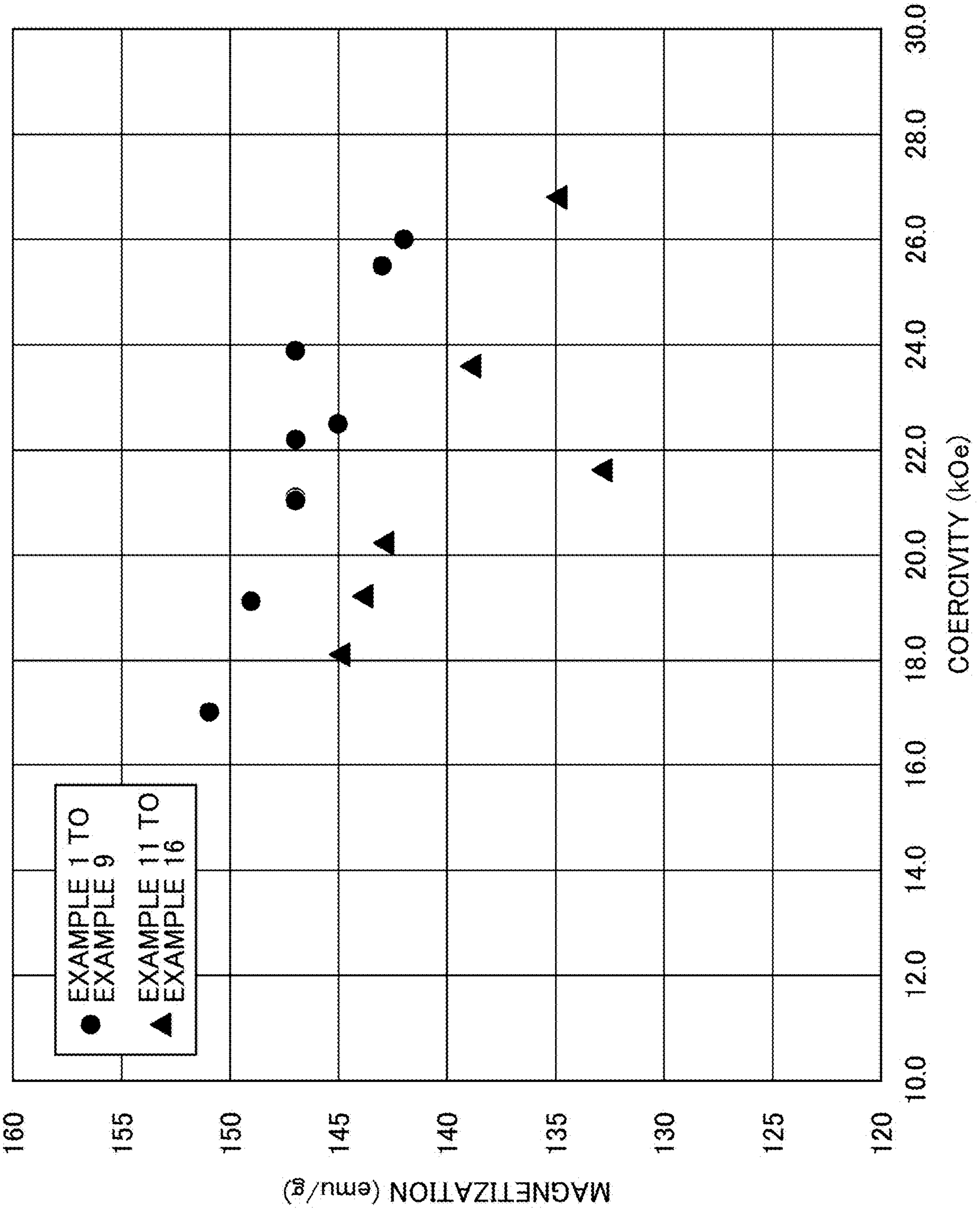
FIG. 4 is a graph illustrating a relationship between coercivity and magnetization obtained in each example.

FIG. 4 illustrates the relationship between the coercivity and the magnetization obtained in each magnet powder.

From FIG. 4, it was confirmed that the magnet powders of Examples 1 to 9 had higher coercivity and magnetization compared to the magnet powders of Examples 11 to 16.

(Measurement of Nitrogen Release Temperature and Decomposition Temperature)

The nitrogen release temperature and the decomposition temperature of each magnet powder were measured by a thermogravimetry device connected to a mass spectrometer. The measurement condition was a heating rate of 20° C./minute under argon atmosphere.

Figure 5:
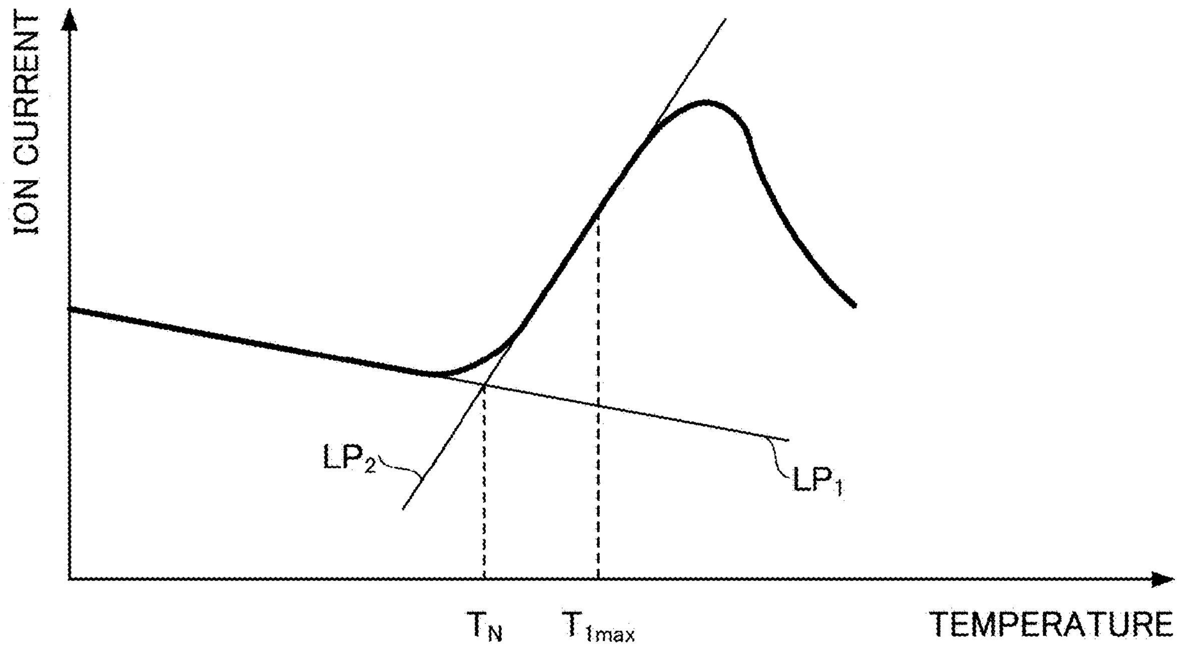
FIG. 5 is a diagram schematically illustrating a graph obtained when measuring a nitrogen release temperature.

FIG. 5 schematically illustrates the graph obtained when measuring the nitrogen release temperature. In FIG. 5, the horizontal axis is the temperature, and the vertical axis is the ion current derived from Nat with a mass-to-charge ratio (m/z) of 28.

The nitrogen release temperature is determined as follows. First, as illustrated in FIG. 5, a first approximation straight line $LP_1$ is drawn so as to correspond to the change in ion current in the temperature range of 500° C. to 550° C. Next, the temperature $T_{1max}$ at which the change in the ion current (the positive slope of the curve in FIG. 5) becomes maximum is determined, and a second approximation straight line $LP_2$ is drawn in the region of $T_{1max}$ #10° C. centering on the temperature $T_{1max}$.

The nitrogen release temperature $T_N$ is obtained from the intersection of the extension lines of the two approximation straight lines $LP_1$ and $LP_2$. When the first approximation straight line significantly deviates from the actual change in ion current, a temperature region in which there is relatively little variation is determined within the temperature range of 400° C. to 600° C., and the first approximation straight line $LP_1$ is drawn at the region. The range of the temperature region is set to 50° C., and for example, the temperature region is 450° C. to 500° C. and the like.

As a result of the measurement, the nitrogen release temperature of each of the magnet powders of Examples 1 to 9 was 610° C. or higher.

Figure 6:
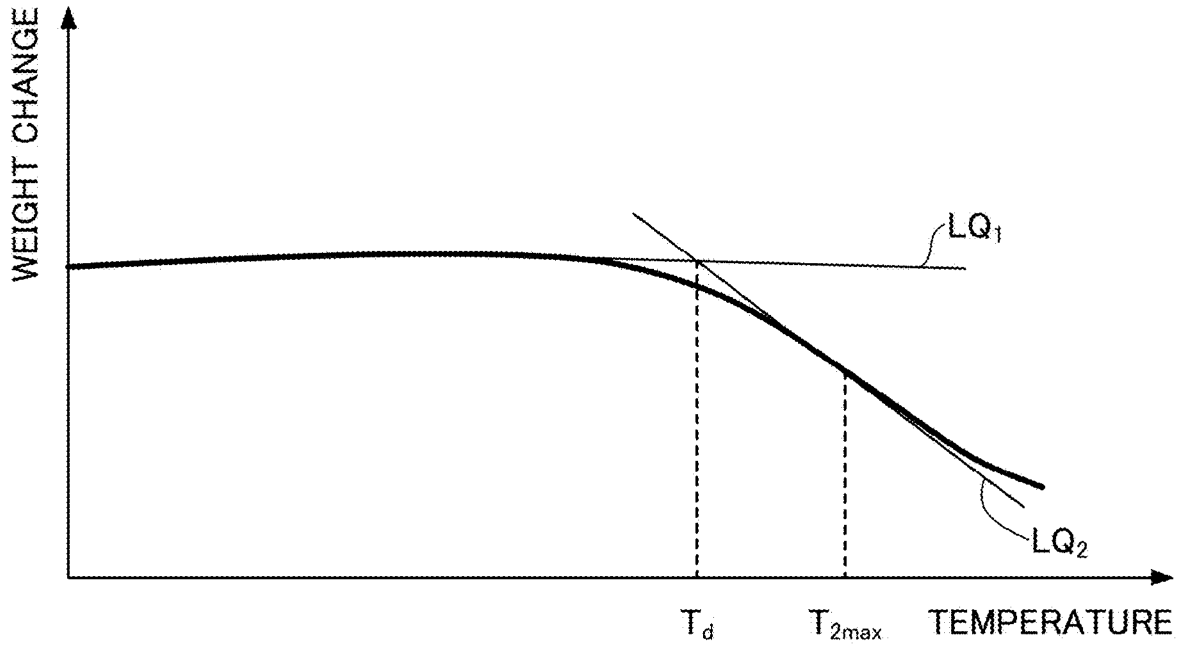
FIG. 6 is a diagram schematically illustrating a graph obtained when measuring a decomposition temperature.

FIG. 6 schematically illustrates the graph obtained when measuring the decomposition temperature. In FIG. 6, the horizontal axis is the temperature and the vertical axis is the weight change.

The decomposition temperature is determined as follows. First, in FIG. 6, a first approximation straight line $LQ_1$ is drawn so as to correspond to the weight change in the temperature range of 500° C. to 550° C. Next, the temperature $T_{2max}$ at which the negative change in the weight change curve (the negative slope of the curve in FIG. 6) becomes maximum is determined, and a second approximation straight line $LQ_2$ is drawn in the region of $T_{2max}$±10° C. centering on the temperature $T_{2max}$.

The decomposition temperature Ta is obtained from the intersection of the extension lines of the two approximation straight lines $LQ_1$ and $LQ_2$. When the first approximation straight line significantly deviates from the actual decomposition temperature change, a temperature region in which there is relatively little variation is determined within the temperature range of 400° C. to 600° C., and the first approximation straight line $LQ_1$ is drawn at the region. The range of the temperature region is set to 50° C., and for example, the temperature region is 450° C. to 500° C. and the like.

As a result of the measurement, the decomposition temperature of each of the magnet powders of Examples 1 to 9 was 630° C. or higher.

(Lattice Constant)

The lattice constant of each magnet powder was measured by the following method.

A borosilicate glass capillary with an inner diameter of 0.3 mm was filled with the magnet powder.

Next, diffraction peaks were measured by synchrotron radiation X-ray diffraction method (transmission method) using a large Debye-Scherrer camera at beamline BL19B2 of Spring-8 (manufactured by Japan Synchrotron Radiation Research Institute (JASRI)). The X-ray wavelength was 0.496103 Å, and a semiconductor detector was used as the detector. The exposure time per exposure was 60 seconds, and the results of four exposures were accumulated. The measurements were performed at room temperature.

The lattice constant of the magnet powder was calculated Rietveld analysis from the obtained measurement results.

Figure 7:
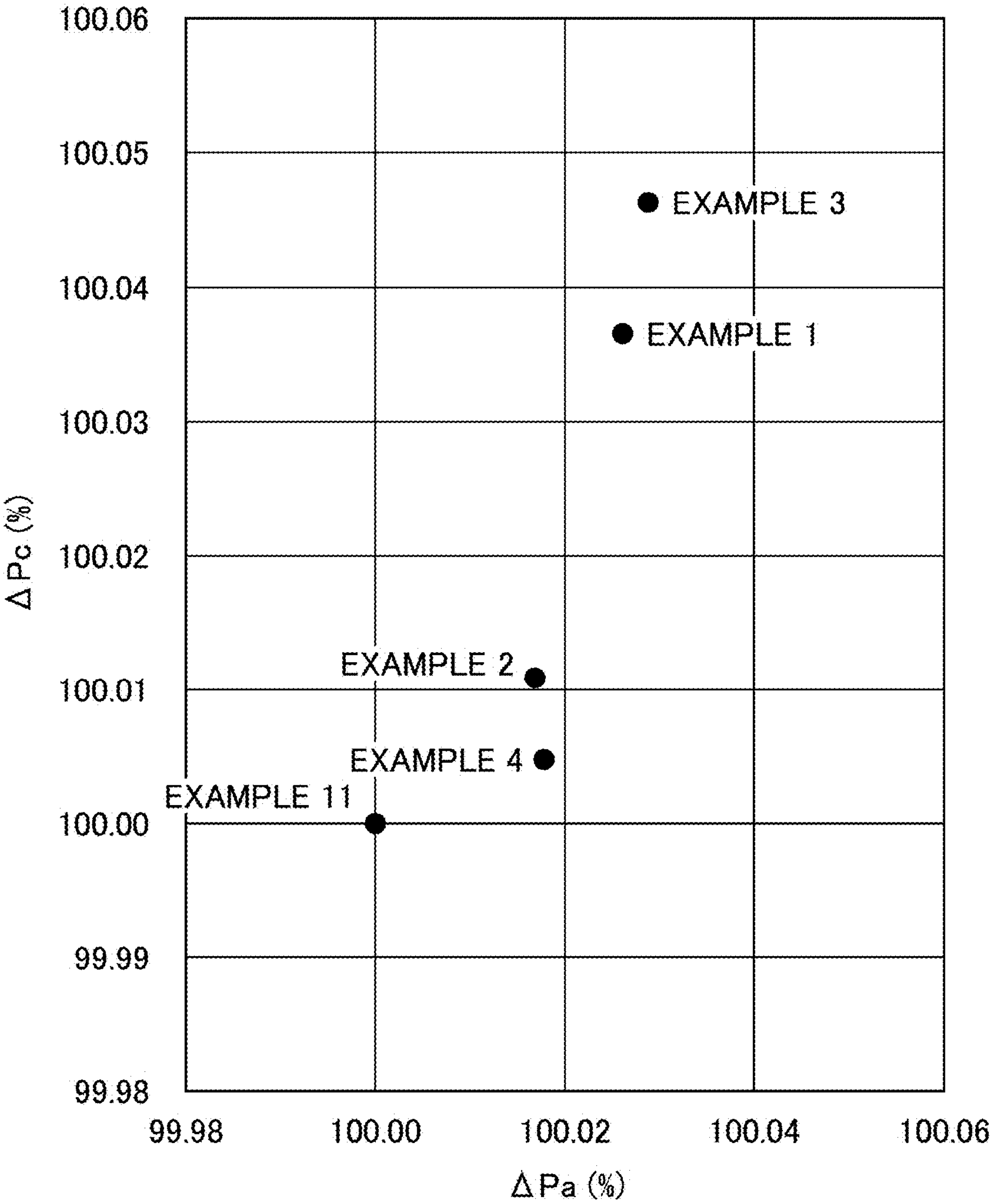
FIG. 7 is a graph illustrating a lattice constant change rate ΔPa (%) in the a-axis direction and a lattice constant change rate ΔPc (%) in the c-axis direction for each magnet powder.

FIG. 7 illustrates the lattice constant measurement results obtained for each magnet powder.

In FIG. 7, the horizontal axis is the lattice constant change rate ΔPa (%) in the a-axis direction of the magnet powder, and the vertical axis is the lattice constant change rate ΔPc (%) in the c-axis direction of the magnet powder.

ΔPa and ΔPc are determined as follows.

First, the magnet powder to be evaluated (for example, the magnet powder of Example 1) is determined. The magnet powder to be evaluated is hereinafter referred to as a "target powder".

Next, a base powder corresponding to the target powder is prepared. The base powder is a samarium-iron-nitrogen magnet powder, and thus a lanthanoid (Ln) other than samarium, bismuth, and tungsten is not included. Samarium, iron, and nitrogen in the base powder have the same composition ratio as the target powder.

Next, the lattice constant Pa (ref) in the a-axis direction and the lattice constant Pc (ref) in the c-axis direction of the base powder are measured. The lattice constant Pa in the a-axis direction and the lattice constant Pc in the c-axis direction of the target powder are measured.

From the obtained results, the lattice constant change rates ΔPa and ΔPc were evaluated as follows.

$$\Delta Pa=(Pa/Pa(\mathrm{ref}))\times 100$$

$$\Delta Pc=(Pc/Pc(\mathrm{Ref}))\times 100$$

When the lattice constant change rate ΔPa exceeds 100%, it means that the target powder is expanded in the a-axis direction compared to the base powder. Conversely, when the lattice constant change rate ΔPa is less than 100%, it means that the target powder is shrunk in the a-axis direction compared to the base powder.

The same can be said for the lattice constant change rate ΔPc.

From FIG. 7, in the magnet powder of Example 11, it can be seen that both of the lattice constant change rates ΔPa and ΔPc are 100%. Therefore, it is assumed that the magnet powder of Example 11 has a crystal lattice structure similar to that of the base powder.

In contrast, in the magnet powder of Examples 1 to 4, it can be seen that both of the lattice constant change rates ΔPa and ΔPc are more than 100%. That is, in the magnet powder of Examples 1 to 4, the lattice was expanded in both the a-axis direction and the c-axis direction compared to the respective base powders.

From this result, it is considered that, in the magnet powder of an embodiment of the present invention, the crystal lattice was expanded in both the a-axis and the c-axis, and the stability of the crystal structure of the particles was improved, and thus both magnetization and coercivity were improved.

The present application claims priority to Japanese Patent Application No. 2022-050743, filed Mar. 25, 2022, with the Japanese Patent Office, the contents of which are incorporated herein by reference in their entirety.

The invention claimed is:

1. A samarium-iron-nitrogen based magnet powder comprising a lanthanoid (Ln), iron (Fe), bismuth (Bi), tungsten (W), and nitrogen (N), wherein the lanthanoid includes samarium (Sm), an atomic percent of bismuth to a sum of the lanthanoid, iron, bismuth, and tungsten (Bi/(Ln+Fe+Bi+W)) is 1.00 at % or less, an atomic percent of tungsten to the sum of the lanthanoid, iron, bismuth, and tungsten (W/(Ln+Fe+Bi+W)) is 0.05 at % or more and 0.60 at % or less, an atomic ratio of tungsten to bismuth (W/Bi) is 1.0 or more and 30.0 or less, wherein particles each having a core portion and a coating layer coating at least a part of the core portion, are included in the samarium-iron-nitrogen based magnet powder, the core portion of each of the particles has a $Th_2Zn_{17}$-type crystal structure, and the coating layer of each of the particles has a crystal structure different from the crystal structure of the core portion.

2. The samarium-iron-nitrogen based magnet powder according to claim 1, wherein the lanthanoid further includes at least one element selected from a group consisting of lanthanum, cerium, erbium, thulium, and ytterbium.

3. The samarium-iron-nitrogen based magnet powder according to claim 1, wherein the core portion of each of the particles has an $Ln_2Fe_{17}N_3$ phase in which at least a part of Ln, Fe, or both is substituted with Bi, W, or both.

4. The samarium-iron-nitrogen based magnet powder according to claim 1, wherein the coating layer of each of the particles contains the lanthanoid and iron.

5. The samarium-iron-nitrogen based magnet powder according to claim 4, wherein an atomic ratio of the lanthanoid to iron (Ln/Fe) in the coating layer is greater than an atomic ratio of the lanthanoid to iron (Ln/Fe) in the core portion.

6. The samarium-iron-nitrogen based magnet powder according to claim 1, wherein the particles have an average particle size of less than 1.5 μm, and a number of the particles having an aspect ratio of 2.0 or more is 10% or less.

7. A samarium-iron-nitrogen based magnet including the samarium-iron-nitrogen based magnet powder of claim 1.

8. A samarium-iron-nitrogen based magnet powder comprising a lanthanoid (Ln), iron (Fe), bismuth (Bi), tungsten (W), and nitrogen (N), wherein the lanthanoid includes samarium (Sm), an atomic percent of bismuth to a sum of the lanthanoid, iron, bismuth, and tungsten (Bi/(Ln+Fe+Bi+W)) is 1.00 at % or less, an atomic percent of tungsten to the sum of the lanthanoid, iron, bismuth, and tungsten (W/(Ln+Fe+Bi+W)) is 0.05 at % or more and 0.60 at % or less, an atomic ratio of tungsten to bismuth (W/Bi) is 1.0 or more and 30.0 or less, and a nitrogen release temperature of the samarium-iron-nitrogen based magnet powder is 610° C. or more.

9. A samarium-iron-nitrogen based magnet including the samarium-iron-nitrogen based magnet powder of claim 8.

* * * * *